United States Patent
Ramachandrula et al.

(10) Patent No.: US 8,499,235 B2
(45) Date of Patent: Jul. 30, 2013

(54) METHOD OF POSTING CONTENT TO A WEB SITE

(75) Inventors: Sitaram Ramachandrula, Kamataka (IN); Anjaneyulu Seetha Rama Kuchibhotla, Kamataka (IN); Suryaprakash Kompalli, Kamataka (IN); Shekhar Ramachandra Borgaonkar, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 12/972,564

(22) Filed: Dec. 20, 2010

(65) Prior Publication Data
US 2012/0050548 A1    Mar. 1, 2012

(30) Foreign Application Priority Data

Aug. 28, 2010   (IN) ............................ 2499/CHE/2010

(51) Int. Cl.
*G06F 17/00*    (2006.01)
(52) U.S. Cl.
USPC ............ 715/234; 715/235; 715/226; 715/268
(58) Field of Classification Search
USPC .......................... 715/226, 235, 253, 268, 234
See application file for complete search history.

(56) References Cited

U.S. PATENT DOCUMENTS

| | | | |
|---|---|---|---|
| 7,293,697 B2 | 11/2007 | Wiebe et al. | |
| 7,707,039 B2 | 4/2010 | King et al. | |
| 7,747,941 B2 | 6/2010 | Campbell et al. | |
| 2003/0004991 A1* | 1/2003 | Keskar et al. | 707/512 |
| 2003/0177090 A1* | 9/2003 | Eden | 705/40 |
| 2004/0205533 A1* | 10/2004 | Lopata et al. | 715/507 |
| 2006/0061806 A1* | 3/2006 | King et al. | 358/1.15 |
| 2006/0104515 A1* | 5/2006 | King et al. | 382/190 |
| 2007/0247673 A1* | 10/2007 | Rosenfeld et al. | 358/474 |
| 2008/0201118 A1 | 8/2008 | Luo | |
| 2008/0292195 A1* | 11/2008 | Vijayasenan et al. | 382/224 |
| 2009/0190168 A1* | 7/2009 | Furuta et al. | 358/1.15 |
| 2009/0251338 A1 | 10/2009 | Marggraff et al. | |
| 2009/0280783 A1 | 11/2009 | Klassen et al. | |
| 2010/0251092 A1* | 9/2010 | Sun | 715/222 |

FOREIGN PATENT DOCUMENTS

JP    2006092277 A    4/2006

* cited by examiner

*Primary Examiner* — Cesar Paula
*Assistant Examiner* — Howard Cortes

(57) ABSTRACT

Presented is a method of posting content to a web site. A user input is obtained on a machine readable paper with a predefined template. Later, an electronic image of the machine readable paper is captured along with the user input. The electronic image of the machine readable paper is decoded to identify the predefined template and the predefined template is searched against a repository to find a web site corresponding to the predefined template of the machine readable paper. A web site based on user input is created or modified depending upon whether a web site corresponding to the predefined template of the machine readable paper is found.

15 Claims, 4 Drawing Sheets

METHOD OF POSTING CONTENT TO A WEB SITE

RELATED APPLICATIONS

Benefit is claimed under 35 U.S.C. 119(a)-(d) to foreign application Serial no. 2499/CHE/2010 entitled "METHOD OF POSTING CONTENT TO A WEB SITE" by Hewlett-Packard Development Company, L.P., filed on 28 Aug., 2010, in india which is herein incorporated in its entirety by reference for all purposes.

BACKGROUND

People's search for information and knowledge is ubiquitous. With the advent of the internet, the search for content has acquired a new meaning. World Wide Web or the web has become the most common mode for sharing and obtaining information. Today, thousands of web sites offer a variety of content, on a diversity of subject matters, with new web sites getting added to the web each day. However, the quality and content of the webs sites on offer varies to a great extent. Some of them are limited to only a few web pages (such as, an individual's personal web site). The others may consist of hundreds of pages. The web site of a large corporate enterprise is one example. The type of content in a web site may also vary. Some of them may have simple text and images, the others may contain elaborate user interfaces (UIs) and multimedia objects, such as audio and video files, animation, etc.

The process of creating a web site and adding content to it is no trivial task. Knowledge of HTML (Hyper Text Markup Language) programming (one of the basic elements of a web site design) along with other multimedia tools may be needed to create a useful and appealing experience for a user. Since there is a learning curve involved in understanding the various web site programming languages and tools, the task is often managed by professional web site developers. There are, however, web site development tools available for novice users as well. Unfortunately, they offer limited functionality and features. Also, they are not user friendly for non-tech savvy users. There should be a more seamless way for non-tech savvy users to post content to a web site where the focus is mainly on the content the user wants to post without the use of any authoring tools.

BRIEF DESCRIPTION OF THE DRAWINGS

For a better understanding of the solution, embodiments will now be described, purely by way of example, with reference to the accompanying drawings, in which:

FIG. 2(*b*) illustrates a machine readable paper based on the web site of FIG. 2(*a*) according to an embodiment.

DETAILED DESCRIPTION OF THE INVENTION

For the sake of clarity, it may be mentioned that the terms "web site", "web page" and "web form" are used interchangeably through out this document.

Also, the term "paper", in the context of the present disclosure, includes any material that may be used for writing or printing upon. An image of the paper document could also be potentially used instead.

With computers and internet connectivity becoming more affordable, millions of people have found a new medium to connect with other people across the globe. The web has opened a new world of information and knowledge. It has also provided a novel mechanism to marketers to offer product and services to a global audience. It is not uncommon these days to find a youngster setting up a personal web site or a blog, or a professional developer setting up a web site for a corporate client. However, as mentioned earlier, developing a web site requires effort. Maintaining and modifying the web site requires even further effort. Therefore, it would be ideal if there could be a simple mechanism for posting content to the web that also supports non-tech savvy users.

Embodiments of the present solution provide a method and system for posting content to a web site using paper and an image capture device.

Figure 1:
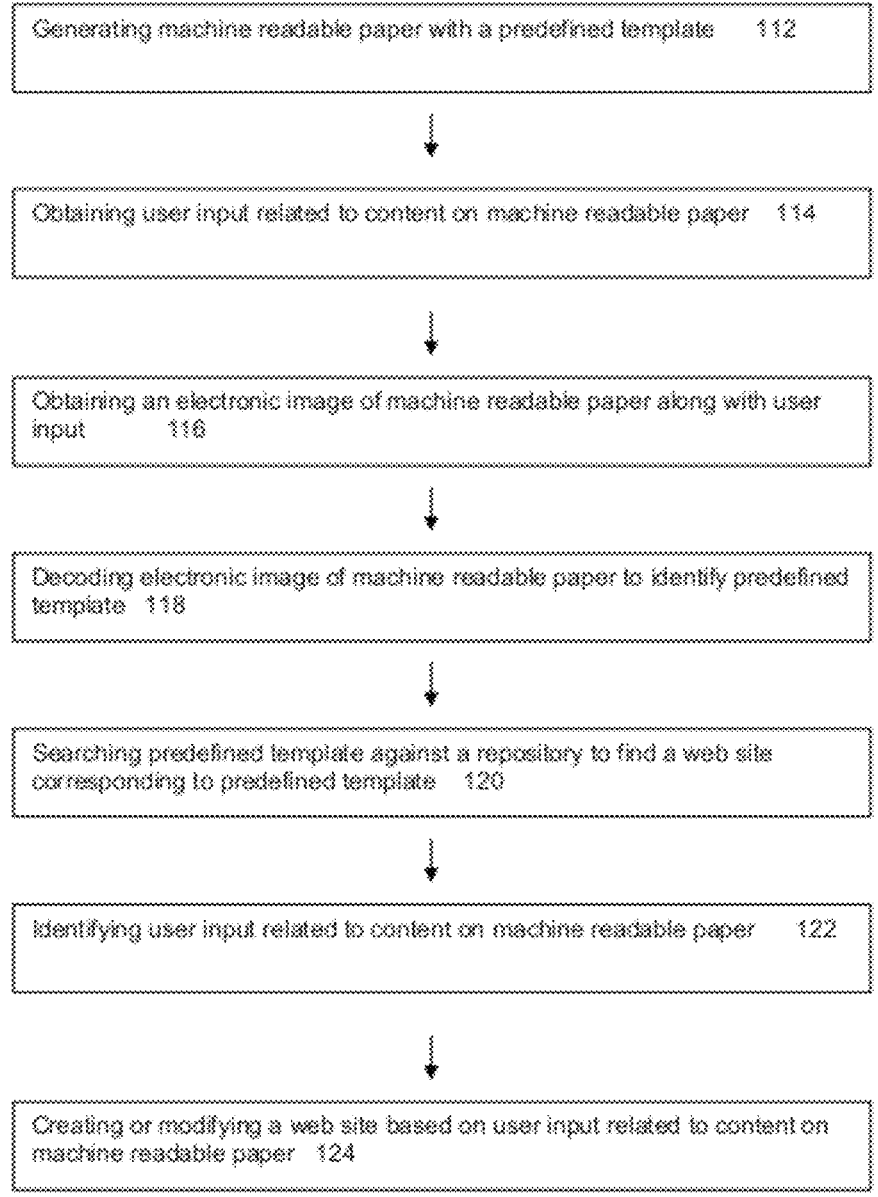
FIG. 1 shows a flow chart of a computer-implemented method of posting content to a web site web according to an embodiment.

FIG. 1 shows a flow chart of a computer-implemented method of posting content to a web site according to an embodiment.

Step 112 involves generation of a machine readable paper (corresponding to a website) with a predefined template. For the sake of clarity, the term machine readable paper includes a paper that is capable of storing data in a machine readable format that can be accessed and read by a sensing device, such as a scanner. Machine readable paper may be identified by a paper identification technique, such as, but not limited to, Locally Likely Arrangement Hashing (LLAH). Other examples of a machine readable paper include a paper having barcodes and/or magnetic ink characters. Common machine readable technologies such as optical character recognition (OCR) and barcode recognition may be used to read such papers.

As mentioned above, the machine readable paper is generated with a predefined template. The predefined template, in the present context, may include the template of an existing web page or a future web page. To illustrate, by way of an example, if an existing web page (of a web site) includes a "Title" text in bold at the top of the page, an image below the "Title" and detailed text (let's say, a paragraph about the image) in normal font below the image, the whole layout with related elements (Title, image and detailed text) and their spatial arrangement with regards to each other may be termed as the "template" of the web page. Each element of a template would of course also have an associated content. For example, the element "Title" may be a movie, such as, "Spiderman". In this case, the word "Spiderman" would be the content.

An embodiment of the method envisages each web site having a predefined template. In case of an existing web site, the template is already defined by its developer. Therefore, in case of an existing web site, the machine readable paper may be generated with the predefined template of the web site. In an embodiment, a web template extractor module may be used to extract a template of a web site. Subsequently, a print of the extracted template may be obtained along with editable fields of the web site. In another scenario, the print may contain editable fields of the web site along with existing web site content.

If the web site is yet to come into existence, the method envisages that the developer has pre-decided the template of the web site in advance. In such case, the machine readable paper may be generated with the pre-decided or predefined template of a future web site. In both scenarios, the template of a machine readable paper would be based on the template of an existing or future (as the case may be) web site.

Machine readable paper with a predefined template of a web site may include information related to the web site. In an embodiment, the LLAH technique, along with a database of web site templates, may be used to find out the URL (Uniform Resource Locator) of a paper. In another embodiment, a barcode (on the machine readable paper) may include URL (Uniform Resource Locator) information of the web site, field specifiers on related web site, etc. The web site related information on the machine readable paper enables identification of the web site, and helps establish an association between the predefined template of the paper and the web site. To illustrate this and other above mentioned aspects of this disclosure, reference may be made to FIGS. 2(a) and 2(b).

In another embodiment, a predefined template may not be necessary. Handwritten commands may map different parts of the content on a paper sheet to different fields required by a web page. For example people can post to a blog website (or even email) by writing on a white sheet in a specific syntax.

Figures 2A, 2B:
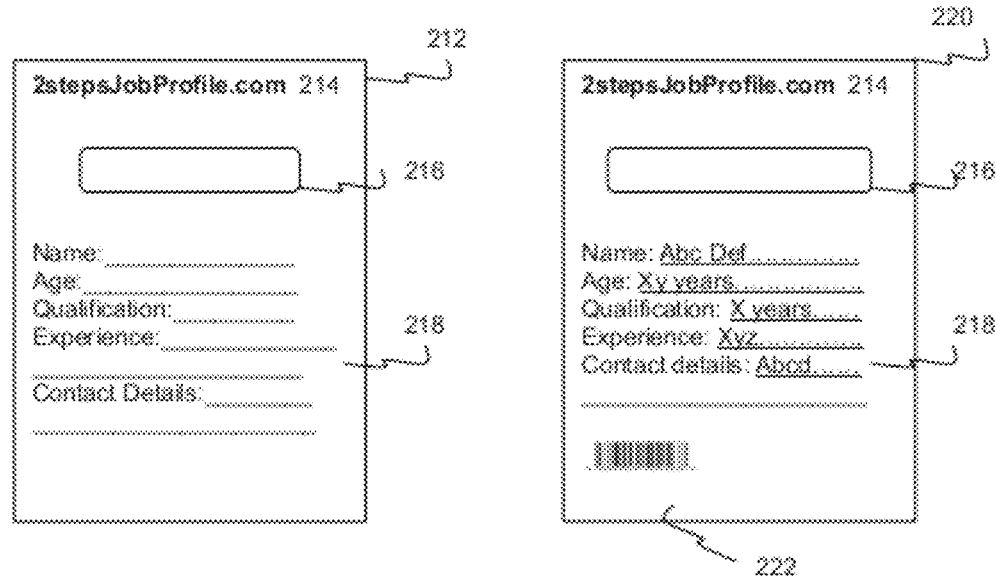
FIG. 2(*a*) illustrates a web site according to an embodiment.

FIG. 2(a) illustrates an exemplary web site (for example, www.2stepsJobProfile.com) 212 with a predefined template. The web site in the example allows an individual to upload his or her job related profile in two easy steps. The predefined template of the web site 212 includes a "Title" text filed (2stepsJobProfile.com) 214 in bold at the top of the page, an image field 216 below the "Title" field, and a profile content field 218 in font size 10 below the image. The existing template (Title, image and content fields) of the web site allows an individual to upload his or her profile for a job application. An individual may upload his/her profile details (such as, Name, Age, Qualification, Experience, Contact details, etc.) to the profile content field of the web site. He or she may also upload a personal photograph to the image field.

FIG. 2(B) illustrates a machine readable paper (220) based on the web site of FIG. 2(a). The machine readable paper (220) comprises the same predefined template of the web site (www.2stepsJobProfile.com) of FIG. 2(a), with all associated elements (214, 216, and 218). In the present example, an individual has provided his or her profile details by writing on the machine readable paper version of the web site. The present embodiment also includes a barcode 222, which may contain information regarding the web site (such as, its URL). The information in the barcode helps in the identification of the web site (www.2stepsJobProfile.com). It also helps establish the presence of a correlation between the predefined template of the machine readable paper and the web site (www.2stepsJobProfile.com).

A computer application operatively coupled to a computing device(s) (such as, a desktop computer system, a laptop, printer, etc.) may be used to generate a machine readable paper with a predefined template. In an embodiment, a simple print-out of an existing web page ("web form") may be treated as machine readable version of the web site with its predefined template. In another embodiment, a template (for example, for a future web page) may be created using a computer application, and a machine readable version is subsequently generated by taking a print-out of the template ("web form").

The machine readable paper with a predefined template may be made available to a user in the form of printed forms etc. It may also be printed in newspapers, magazines or any other print medium, and distributed as pamphlets.

Figure 3:
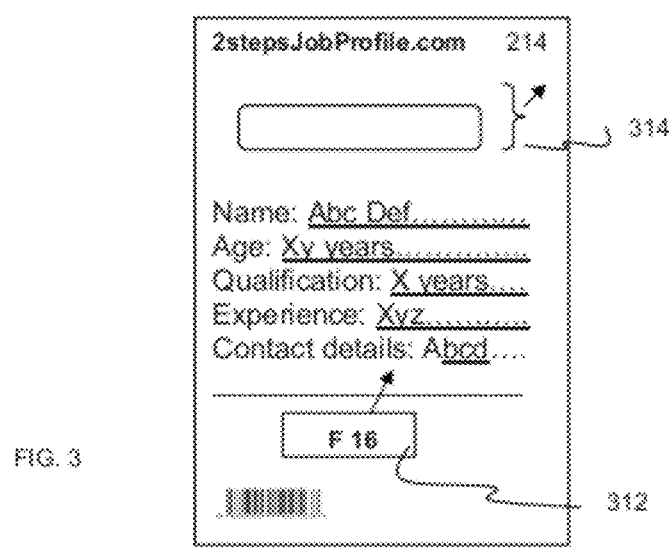
FIG. 3 illustrates providing a user input on a machine readable paper according to an embodiment.

Step 114 involves obtaining a user input on the machine readable paper (with a predefined template). Once a corresponding machine readable paper of a web site ("web form") has been generated, a user may wish to modify some aspect of a template element or its associated content. In other words, a user may wish to add, delete or modify any element and/or its associated content. This could be carried out by providing a corresponding user input on the machine readable paper indicating functionality to be performed in relation to the content. Therefore, a user input may be related to the content on the machine readable paper or a functionality to be performed in relation to the content on the machine readable paper. To illustrate using the example mentioned above, the image and/or content fields (of FIG. 2(B)) may be modified by providing an appropriate user input. FIG. 3 provides an example. Let's assume a user wants to increase the font size of the text (in the present case, a user's profile details) in the content field. The user may indicate his preference by providing an appropriate input on the machine readable version of the web site. In one embodiment, the user may provide an input in the form of an arrow and an "F xx" annotation in a box 312, where "F" indicates "font" and "xx" represents "font size" (for example, 16). However, numerous other variations are possible. In another example, let's assume that the user wants to change the location of the image (for example, a personal photograph) on machine readable version of the web site. In this case, the user may use a parenthesis and an arrow annotation to indicate the new location 314. This is again illustrated in FIG. 3.

A user may use various types of annotations and other markup information to provide his or her inputs. The annotations may be of normal text for which handwriting recognition is possible, or simple ticks or special symbols indicating commands to be carried out on the associated content. In another scenario, an input at a predefined position may lead to the recognition of that input. For example, pasting a photograph at a predefined position or field (on the machine readable paper) may add new photo to the corresponding web page (or replace an existing photo corresponding to that field if an annotation specifies the same).

Step 116 involves obtaining an electronic image of the machine readable paper. The user input obtained in step 114 is also captured during the process. An image capture device, such as, a multi-purpose scanner (for example, an All-in-One (AiO), an MFP (Multifunction printer), etc.) or a digital camera (including, a mobile phone with an inbuilt digital camera) may be used to capture an electronic image of the machine readable paper (with a predefined template) and user input.

Step 118 involves decoding the electronic image of the machine readable paper to identify the predefined template in the machine readable paper. The electronic image may be decoded by one of the following methods. However, other methods could also be used.

a) A machine readable barcode may be added to the machine readable paper document to identify the template at a later stage. The bar code could be read by a bar code scanner or the bar code could be processed by a software program residing on an attached computing device, such as a scanner or a mobile phone. FIG. 2A provides an illustration of a machine readable paper having a bar code.

b) Once a machine readable document is printed, some unique points (locations, x, y coordinates) on the document may be identified. The same points are identifiable even after a scan of the document. An example of such kind of points is SIFT (Scale-invariant feature transform). The points form a unique point patterns for a document image based on the content of an image. The document identification identifies the unique point pattern of an image by using Geometric hashing of these points. An instance of Geometric hashing is LLAH (Locally Likely Arrangement Hashing). Once a document is identified, the next steps explain how corresponding URL could be found/retrieved from the database and how corresponding template of the paper/form can be used to align the present input paper to extract the content from each of the field.

In case of known handwritten syntax (for example, in case of special handwritten marks etc.) on the machine readable paper, the handwriting and ticks (user input) are recognized from the electronic image by using offline handwriting and special symbol recognizers. Such annotations may act as a substitute for the machine readable information that can be printed on the form. The user input which is in handwritten form is converted to machine code like ASCII, UNICODE, etc. using handwriting recognition technology, before posting the content onto the website.

In another embodiment, an image of the handwriting may be extracted and used, if a handwriting recognizer is not available for a script. In still another example, except for the user inputs that are used to annotate fields on a paper, the rest of the information need not be recognized. The same, however, may be posted as an image.

In an embodiment, steps 116 and 118 may be web-based, such as an online service, in which case the image of a scanned paper is directly uploaded to the online service and processing is done on the cloud.

In another embodiment, the functionality of steps 116 and 118 may be performed by touch of a button on a Multi Function Printer or a mobile device, which may activate a software module for obtaining and processing an image. Further, the software module may reside on a cloud, a mobile or a computing device, either in whole or in parts.

In step 120, the identified predefined template is searched against a repository, containing templates (or information related thereto) for a plurality of web sites. If the predefined template is based on the template of an existing web site, a search against the repository would identify a web site having a corresponding template. To illustrate, if the extracted predefined template was based on a web site www.2stepsJobprofile.com, a search against the repository would identify the web site www.2stepsJobprofile.com, assuming the web site template (or details related thereto) was present in the repository. A search would, therefore, identify a web site having a template corresponding to the machine readable paper.

In case the predefined template is for a future web site and the template is searched against the repository for the first time, the repository would capture the details of the predefined template and store them for future search purposes.

In an embodiment, if the URL related information is present in the barcode added at an earlier step, a search against the repository to find a web site corresponding to the predefined template may not be needed.

Step 122 involves extracting various template elements (fields) of the machine readable documents and identifying user inputs related to the template elements and/or associated content. A form recognition technology using image registration may be used for this purpose. In an embodiment, a user filled form's image (input) is aligned with an empty template's image (which is already identified from the same input image or from barcodes) to extract each field's image content. Since a field's content may vary (for example, some fields may have handwritten text, some fields may contain photographs, some may have a signature to login, etc.), each field may be processed based on its content type. For example, if a user input related to a template element, let's say, "Title", is to change the font from A to B, the method step would recognize the "Title" element, and the user input "change font from A to B". Step 122 may capture all template elements and their related user inputs either simultaneously or sequentially.

Step 124 involves creating or modifying the web site, corresponding to the machine readable paper (identified in step 120), based on user inputs identified in step 122. The template of the corresponding web site is modified per the user modifications provided on the machine readable paper. To illustrate with the example mentioned in step 122, for the web site corresponding to the machine readable paper in this case, the "Title" font would change from A to B.

In another embodiment, if there's no web site corresponding to the machine readable paper, a web site (or a web page) is created based on user inputs on the machine readable paper. Once the template elements of a machine readable paper (for a future or a non-existent web site) are recognized along with user inputs (step 122), the method step creates a web site based on the recognized template elements of the machine readable paper. The content in the machine readable paper, if any, is also posted to the web site. To provide an illustration, let's assume a user wants to create a web site to post his or her resume. In this case, a user may obtain a machine readable paper with a predefined template. The predefined template may have a Title ("Resume"), an image portion (to upload a user's photograph) and a text portion (to add a user's qualification details, etc.). Once the user has provided the relevant content (image, qualification details, etc.), the method steps mentioned above are followed and, if there's no web site corresponding to the machine readable paper, a web site (or a web page) is created with the user's content (resume) details.

To provide another example, an email may be sent by simply writing on a machine readable paper with a predefined template of an email interface. All that may be required is for an individual to write text and provide an email address at pre-designated content fields of a machine readable paper. An electronic image of the paper may be sent out as an SMS or email with image attachment and later processed as per disclosed embodiments.

To provide yet another example, a carpenter who might want to offer his services to people at large may do so by obtaining a machine readable paper version of a classified website's template. By adding his services details and contact information at the pre-designated fields on the paper version, and processing it per disclosed embodiments, the carpenter will be able to post his service listing to the classified web site.

To provide a further example, a blogger may update his blog by obtaining a machine readable paper version of his blog site. By adding his latest comments at a pre-designated field on the paper version, and processing it per disclosed embodiments, the blogger will be able to post his new entry to the blog site.

In a still further example, an embodiment may be used to submit online forms on a web site(s). For example, a PAN (Permanent Account Number) form, a college or school application form, etc. may be submitted by just writing on a paper version of the online form. An electronic image of the filled-in form could be obtained using a web connected mobile phone camera or a scanner. Later, a repository (containing form templates) maintained at a telecom service provider's end could be used to identify the form. Once identified, the form fields can be extracted and recognized by form processing technology and OCR/HWR (Handwriting recognition), respectively, before entering the user content into a database.

A specific field if filled can indicate it is to modify vs creation of a new entry!

The method steps described above may not necessarily be performed in the sequence as outlined above. The steps may be performed in any other sequence as well, with a step(s) being performed prior or later to other method steps. Further, the method steps may be used with pre-existing web sites or with specially designed web sites that support the embodiments described herein.

Figure 4:
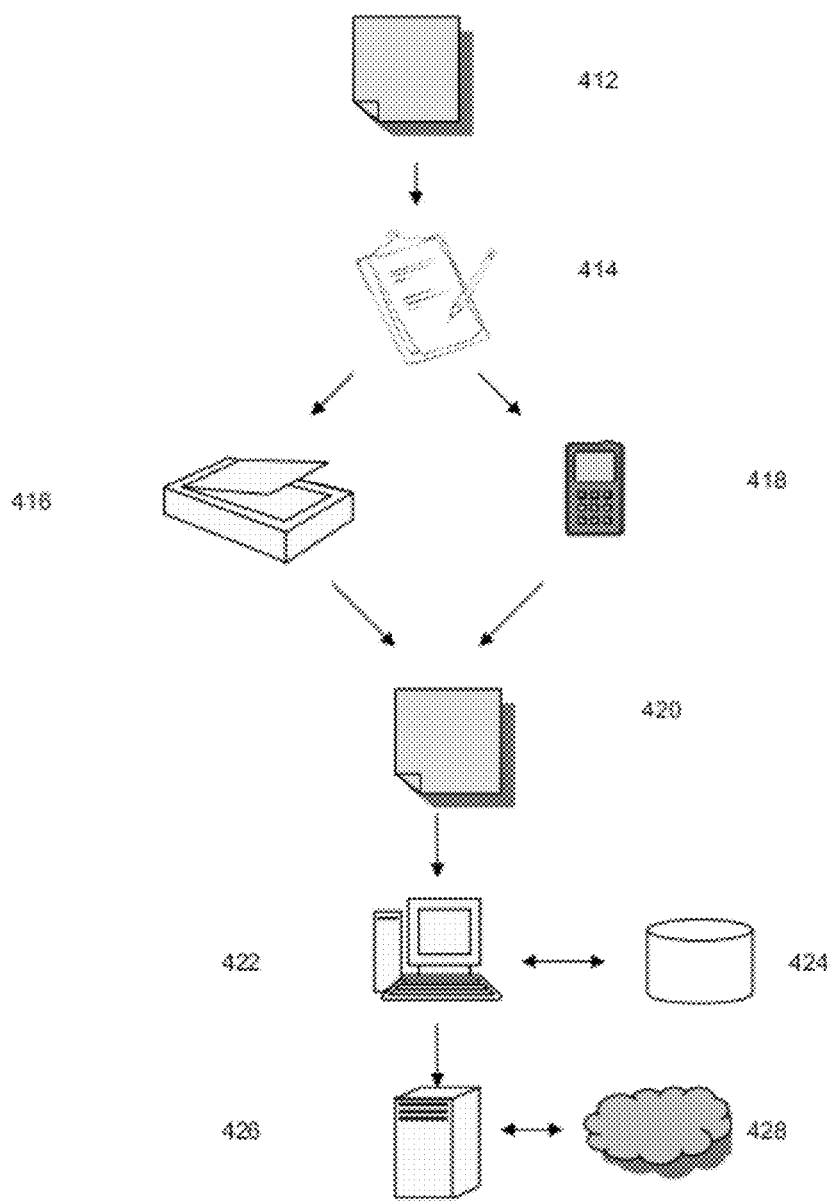
FIG. 4 shows a diagram of a system illustrating a representative environment in which the embodiments of the system operate according to an embodiment.

FIG. 4 shows a diagram of a system illustrating a representative environment 400 in which the embodiments of the system operate according to an embodiment.

The system includes an image capture device, such as, but not limited to, a scanner 416 and/or a digital camera (for example, in a mobile phone 418), a computer system 422, a repository (database) 424, and a computer server 426. The system components may be connected with each other via a network, such as, the internet or an intranet, through wired or wireless means.

The representative environment 400 envisages generation of a machine readable paper with a predefined template 412. As mentioned earlier, the machine readable paper with a predefined template 412 may be made available to a user in the form of printed forms etc. It may also be printed in newspapers, magazines or other print medium for simple distribution to people at large. A user may provide his or her input related to content or template elements on the machine readable paper 414.

The scanner 416 is a device that optically scans a document and converts it to an electronic image. Some common types of scanners include a flatbed scanner (where the document is placed on a glass window for scanning), a drum scanner and a hand-held scanner. A digital camera, such as, in a mobile phone 418, may also be used for capturing a digital image of a document. In the present representative environment 400, a scanner or a mobile phone with a digital camera is used to obtain an electronic image of the machine readable paper 420.

The computer system 422 may be any kind of computing device, such as, but not limited to, a personal computer, a desktop computer, a laptop computer, a notebook computer, a network computer, a personal digital assistant (PDA), a mobile device, a hand-held device, or any other suitable computing device. Further, the system 422 may be a standalone system or a network system or a cloud based system connected to other computing devices through wired or wireless means. In an embodiment, the image capture device (such as, scanner 416 and/or mobile phone with a digital camera 418) and the computer system 422 may be integrated into one computing device.

The computer server 426 is a computer that provides services used by other computers. A web server delivers content, such as web pages, using the Hypertext Transfer Protocol (HTTP), over the World Wide Web 428. In the present environment, the web server 426 serves as a link between the computer system 420 and the web 428. It transfers content (web pages) from the computer system 420 to the web 428 and vice versa. It uploads a newly created or modified web page (or a web site), wherein the created or modified web page is based on a user input on a machine readable paper, to the web 428. In another embodiment, it may upload the web page to an intranet. In a yet another embodiment, the functions of the computer server 426 may be performed by the computer system 422.

Figure 5:
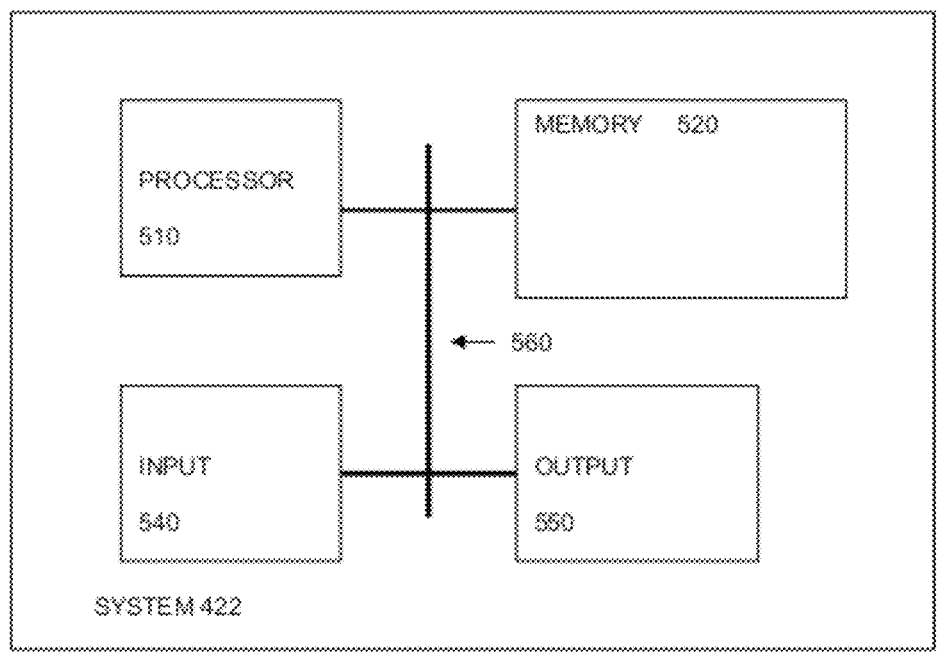
FIG. 5 shows a block diagram of a computer system according to an embodiment.

FIG. 5 illustrates a block diagram of a computer system 422 according to an embodiment.

The system 422 may include a processor 510, for executing computer executable instructions, a memory 520, an input device 540 and an output device 550. These components may be coupled together through a system bus 560.

The processor 510 is configured to execute machine readable instructions to decode an electronic image of a machine readable paper to identify a predefined template, to search the predefined template against a repository to find a web site (if that information is not explicitly included in a barcode on the paper) corresponding to the predefined template of the machine readable paper, to extract fields in the predefined template, to identify the user input and to create a web site based on the user input, if no web site corresponding to the predefined template of the machine readable paper is found or modify a web site based on the user input if a web site corresponding to the predefined template of the machine readable paper is found.

The memory 520 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 520 may be used for storing a repository 424.

The input device 540 may include a mouse, a key pad, a touch pad or screen, a voice recognizer, and the like. The output device 550 may include a Virtual Display Unit (VDU), a printer, a scanner, and the like.

The system components depicted in FIG. 4 are for the purpose of illustration only and the actual components may vary depending on the computing system and architecture deployed for implementation of the present solution. The various components described above may be hosted on a single computing system (or device) or multiple computer systems (or devices) connected together through suitable means.

The embodiments described provide a simple mechanism of creating web sites or posting content to existing web sites using paper. People just need to write or fill pre-printed forms, or add other content like photographs at appropriate positions on a paper sheet with markup information, for content to be captured and uploaded to a web page (or a web site).

The embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of posting content to a web site, comprising:

obtaining a user input on a machine readable paper with a predefined template;

obtaining an electronic image of the machine readable paper along with the user input;

decoding the electronic image of the machine readable paper;

identifying the predefined template of the machine readable paper from the decoded electronic image;

searching the predefined template of the machine readable paper against a repository to find a web site in the repository corresponding to the predefined template of the machine readable paper;

identifying the user input on the machine readable paper;

if no web site corresponding to the predefined template of the machine readable paper is found, creating a web site based on the user input; and if a web site corresponding to the predefined template of the machine readable paper is found, modifying the web site based on the user input.

2. A method according to claim 1, further comprising, prior to obtaining a user input on a machine readable paper with a predefined template, generating a machine readable paper with a predefined template.

3. A method according to claim 2, wherein the generation of a machine readable paper with a predefined template includes obtaining a print-out of a web site.

4. A method according to claim 1, wherein the predefined template of the machine readable paper corresponds to a template of a prospective web site.

5. A method according to claim 1, wherein the user input is handwritten on the machine readable paper with a predefined template.

6. A method according to claim 5, wherein the handwritten user input is an annotation.

7. A method according to claim 6, wherein the annotation against parts of content on the paper help define a template for the web site.

8. A method according to claim 1, wherein the user input is related to content on the machine readable paper.

9. A method according to claim 1, wherein the user input is related to content on the web site corresponding to the predefined template of the machine readable paper.

10. A method of claim 1, wherein the modification of the web site includes addition, deletion and/or alteration of content on the web site.

11. A system, comprising:
an image capture device to capture an electronic image of a machine readable paper, with a predefined template, along with a user input; and
a computer system, comprising:
a memory for storing a repository;
a processor to execute machine readable instructions to decode the electronic image of the machine readable paper, to identify the predefined template of the machine readable paper from the decoded electronic image, to search the predefined template of the machine readable paper against the repository to find a web site in the repository corresponding to the predefined template of the machine readable paper, to identify the user input on the machine readable paper, and to create a web site based on the user input if no web site corresponding to the predefined template of the machine readable paper is found, or modify a web site based on the user input if a web site corresponding to the predefined template of the machine readable paper is found.

12. A system according to claim 11, wherein the image capture device is a mobile device with a camera.

13. A system according to claim 11, wherein the predefined template of the machine readable paper corresponds to template of a prospective web site.

14. A system according to claim 11, wherein the user input is related to content on the web site corresponding to the predefined template of the machine readable paper.

15. A system according to claim 11, wherein the image capture device and the computer system are integrated into one computing device.

* * * * *